D. McINTYRE.
SELF BINDING HARVESTER.
APPLICATION FILED FEB. 13, 1915.
1,169,048.
Patented Jan. 18, 1916.
2 SHEETS—SHEET 2.
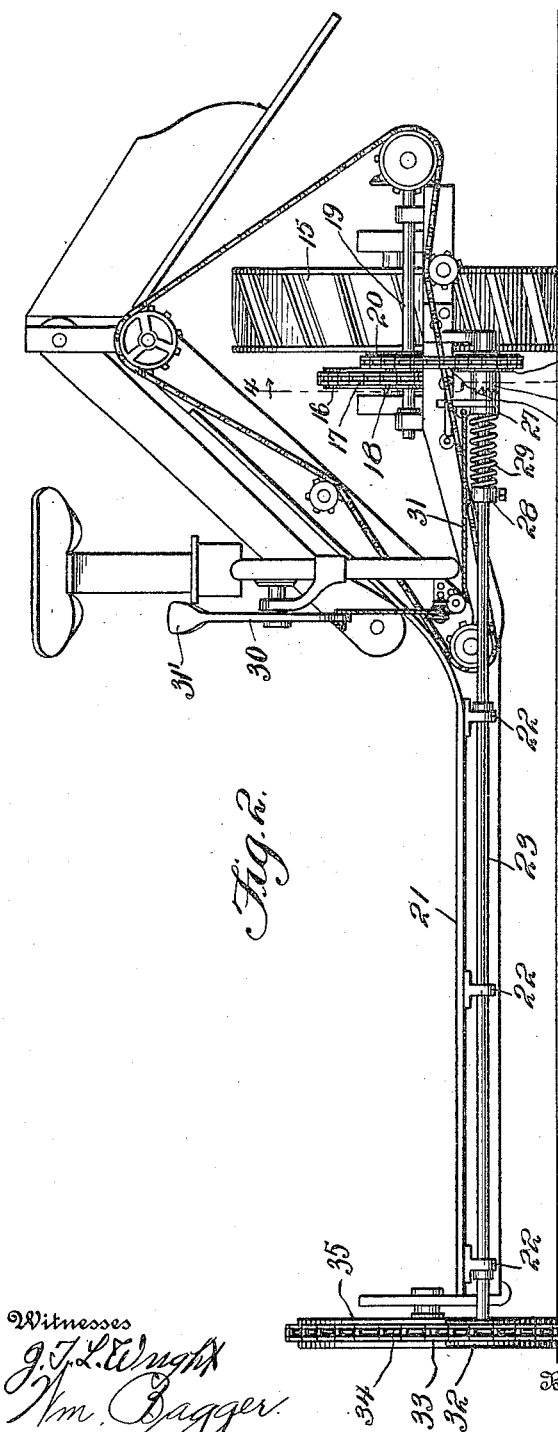
Witnesses
J. T. L. Wright
Wm. Bagger
Inventor
Daniel McIntyre
By Victor J. Evans
Attorney

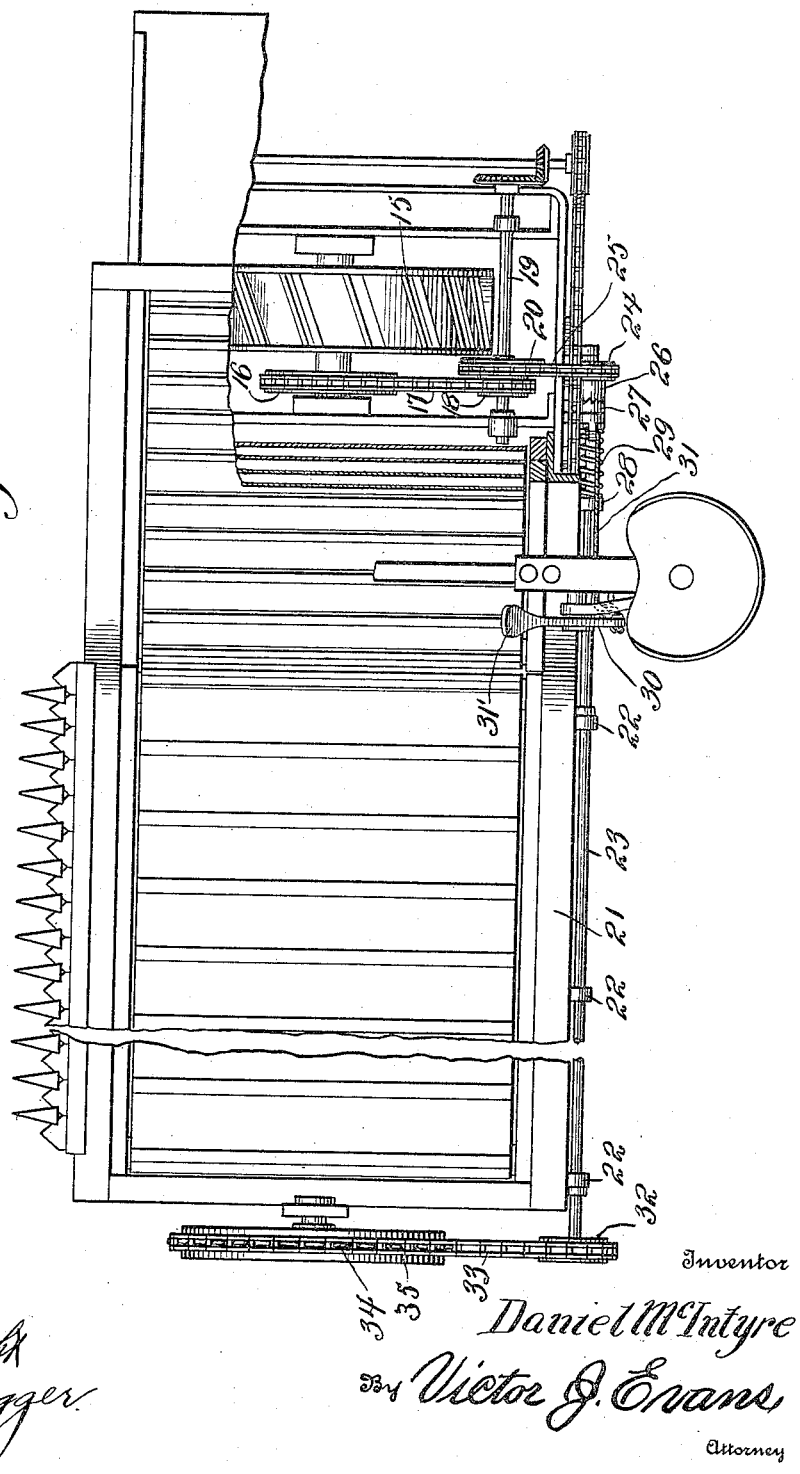

UNITED STATES PATENT OFFICE.

DANIEL McINTYRE, OF SWAN RIVER, MANITOBA, CANADA.

SELF-BINDING HARVESTER.

1,169,048.  Specification of Letters Patent.  Patented Jan. 18, 1916.

Application filed February 13, 1915. Serial No. 8,021.

*To all whom it may concern:*

Be it known that I, DANIEL MCINTYRE, a subject of His Majesty George the Fifth, King of Great Britain and Ireland, &c., and a citizen of the Dominion of Canada, residing at Swan River, in the Province of Manitoba and Dominion of Canada, have invented new and useful Improvements in Self-Binding Harvesters, of which the following is a specification.

This invention relates to self-binding harvesters.

The invention has for its object to eliminate side draft by transmitting motion in a simple and effective manner between a part driven by the bull wheel and the grain wheel of the machine, whereby said grain wheel will be driven in unison with the bull wheel, thus causing the sides of the machine to move in unison and without the objectionable side draft which is present in machines as ordinarily constructed.

A further object of the invention is to produce a transmission means including means whereby the transmission may be thrown out of gear when the machine is to turn a corner at the end of the field, thereby enabling the grain wheel to turn independently of the bull wheel.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a top plan view of a binder equipped with the improvement. Fig. 2 is a rear elevation of the same. Fig. 3 is an end view. Fig. 4 is a vertical sectional view taken on the line 4—4 in Fig. 2.

Corresponding parts in the several figures are denoted by like characters of reference.

Connected with the bull wheel 15 for rotation therewith is a sprocket wheel 16.

17 is the bull chain which serves to transmit motion from the sprocket wheel 16 to a sprocket wheel 18 fixed on a shaft 19 and having another sprocket wheel 20 connected therewith.

The frame 21 of the grain table or platform is provided with bearings 22 wherein a shaft 23 is supported for rotation. The shaft 23 carries at one end a sprocket wheel 24 which receives motion from the sprocket wheel 20 by means of a chain 25. The sprocket wheel 24 is loose on the shaft 23, but may be connected with said shaft so as to drive the latter through the medium of a clutch, one member of which, 26, may be formed on the hub of the sprocket wheel 24 and the other member of which, 27, is mounted slidably on the shaft 23, the latter being also provided with a collar 28 between which and the clutch member 27 a coiled spring 29 is interposed to force said clutch member in the direction of and into engagement with the clutch member 26. The clutch member 27 may be moved against the tension of the spring 29 and out of engagement with the clutch member 26 by the action of a shipping lever 30 with which it is connected in any convenient manner by means including a flexible element 31. The shipping lever 30 is provided with a foot piece or treadle 31' arranged within convenient reach of the foot of the operator.

The shaft 23 is provided at its outer end with a sprocket wheel 32 which is connected by means of a chain 33 with sprocket teeth 34 extending from the rim or periphery of the grain wheel 35, which latter will thus be oppositely driven.

It is obvious that by properly proportioning the members of the transmission device, the grain wheel may be positively driven at a peripheral speed exactly equal to that of the bull wheel, thus causing the two sides of the machine to travel at precisely the same speed, and avoiding all tendency of side draft. When turns are made at the corner of the field or at other places the transmission of motion to the grain wheel may be instantly interrupted so that the making of such turn will not be interfered with.

By forming or providing the grain wheel 35 with sprocket teeth 34 and driving said grain wheel by the transmission chain 33, the circumference of said grain wheel will be kept free from adhering clay and dirt which would tend to vary the circumference thereof, and thereby interfere with the proper transmission of motion.

Having thus described the invention, what is claimed as new, is:—

In a binder, a bull wheel, a grain wheel, a grain platform, a shaft supported in bearings mounted on the grain platform, means including a spring actuated clutch for transmitting motion from the bull wheel to the shaft, means including a shipping lever having a treadle for operating the spring actuated clutch to interrupt the transmission of motion to the shaft, and means for transmitting motion from the shaft to the grain wheel; said means including a transmission chain and sprocket teeth extending radially from the rim of the grain wheel for direct engagement with said chain.

In testimony whereof I affix my signature in presence of two witnesses.

DANIEL McINTYRE.

Witnesses:
 JAMES CANE,
 S. R. WRIGHT.

Copies of this patent may be obtained for five cents each, by addressing the "Commissioner of Patents, Washington, D. C."